United States Patent [19]

Marzocchi et al.

[11] 4,358,320

[45] * Nov. 9, 1982

[54] REINFORCED COMPOSITES

[75] Inventors: Alfred Marzocchi; Michael G. Roberts; Charles E. Bolen, all of Newark, Ohio

[73] Assignee: Owens-Corning Fiberglas Corporation, Toledo, Ohio

[*] Notice: The portion of the term of this patent subsequent to Sep. 4, 1996, has been disclaimed.

[21] Appl. No.: 183,692

[22] Filed: Sep. 3, 1980

[51] Int. Cl.$^3$ .............................................. C08L 95/00
[52] U.S. Cl. .............................. 106/282; 106/281 R; 268/44; 428/378; 428/391; 428/392; 428/489
[58] Field of Search ............. 106/281 R, 282; 208/44; 428/378, 391, 392, 489

[56] References Cited

U.S. PATENT DOCUMENTS

| | | | |
|---|---|---|---|
| 2,771,387 | 11/1956 | Kleist et al. | 154/93 |
| 2,811,769 | 11/1957 | Craig | 28/72.3 |
| 3,372,083 | 3/1968 | Evans et al. | 161/190 |
| 3,457,136 | 7/1969 | Zaadnoordijk | 161/89 |
| 3,837,898 | 9/1974 | McCombs et al. | 117/72 |
| 3,855,167 | 12/1974 | Bowman | 260/28 |
| 3,861,933 | 1/1975 | Doi | 106/273 N |
| 4,026,853 | 5/1977 | Dressnandt et al. | 260/28.5 AS |
| 4,036,661 | 7/1977 | Schmidt et al. | 106/273 N |
| 4,038,096 | 7/1977 | Graf et al. | 106/277 |
| 4,166,752 | 9/1979 | Marzocchi et al. | 106/273 N |
| 4,175,978 | 11/1979 | Marzocchi et al. | 106/281 R |
| 4,251,577 | 2/1981 | Marzocchi et al. | 106/281 R |

*Primary Examiner*—John Kight, III
*Assistant Examiner*—Amelia B. Yarbrough
*Attorney, Agent, or Firm*—Ronald C. Hudgens; Robert F. Rywalski; Keith V. Rockey

[57] ABSTRACT

A reinforced composite formed of a bitumen, an elastomer or a plastic reinforced with a filler containing a coating thereon in the form of a chemically modified bitumen. The chemically modified bitumen employed is one formed by reaction of a linking agent reactive with the bitumen and containing groups reactive with the filler so that the chemically modified bitumen undergoes a chemical reaction with the filler to thereby intertie the coated filler with the continuous phase.

3 Claims, No Drawings

REINFORCED COMPOSITES

This invention relates to reinforced composites, and more particularly to the use of asphalt compositions in the manufacture of reinforced composites.

As is well known to those skilled in the art, asphalt is a cementitious material predominantly in bitumens which occur in nature as such or are obtained as residue in the refining of petroleum. It has been determined that asphalt chemically is made up of condensed hydrocarbon rings, but it has been further determined that the condensed organic rings contain various reactive groups, notably carbon-to-carbon double bonds. In terms of distribution, asphalt is much like a plastisol in that it is formed of graphitic particles suspended in a viscous liquid; the particles are of the same chemical type but differ from each other in terms of molecular weight. Thus, the liquid phase of asphalt is formed predominantly of lower molecular weight condensed organic rings whereas the graphitic particles suspended therein are made up primarily of high molecular weight condensed organic rings.

It is also known that asphalt can be oxidized by heating it and then passing air or a like oxygen-containing gas through it. That asphalt, commonly known as blown asphalt, differs from untreated asphalt in that the softening point is increased. It has been postulated that the oxidation of the asphalt brings about further condensation of aromatic and cyclic hydrocarbon rings to form a greater proportion of higher molecular weight components. In any case, the oxidation of the asphalt does introduce, it has been found, carboxy groups and hydroxy groups.

Asphalt has been used for many years in road-paving applications as well as numerous other applications calling for strong, inert physical and chemical properties such as roofing and the like. An extensive field for the use of asphalt is now in road-paving applications where the asphalt is modified with fillers, notably glass fibers to provide an increase in the strength and wear resistance of road pavements. One of the difficulties, however, in combining glass, either in the form of glass fibers or as fragments of glass, stems from the fact that glass is a highly hydrophilic material, whereas asphalt, being derived from petroleum, is a highly hydrophobic material. Thus, it has been difficult to establish any bond, either physical or chemical, between asphalt and glass surfaces.

It has now been found, in accordance with the concepts of this invention, that the compatibility between glass and other siliceous reinforcement and/or fillers, and bitumens such as asphalt can be significantly enhanced by the use of a bitumen composition which is chemically treated to introduce to the asphalt reactive groups capable of a direct chemical reaction with the filler. In that way, the asphalt can be chemically bonded directly to the filler material and then combined with untreated asphalt in the formation of reinforced asphalt composites.

It is accordingly an object of this invention to provide reinforced bitumen composites wherein the reinforcement is chemically bonded to the bitumen.

It is a more specific object of the invention to provide bitumen composites wherein at least a portion of the composite is formed of a chemically modified bitumen such as an asphalt having groups reactive with the filler to chemically bond the filler to the chemically modified asphalt and thereby assure compatibility between the filler bonded to the asphalt and the asphalt constituting a continuous phase of the composite.

The concepts of this invention reside in a bitumen composite wherein a bitumen constitutes a continuous phase. Dispersed within the continuous phase is a combination of a filler, such as a siliceous filler in the form of aggregate and/or in the form of glass fibers and/or glass flake which have been treated with a chemically modified bitumen, and preferably a chemically modified asphalt, such that there is a chemical bond directly between the chemically modified bitumen and the filler.

It has been found, in accordance with the concepts of this invention, that the treatment of the filler with the chemically modified asphalt to establish a chemical bond therebetween assures compatibility and strength between the filler treated with the chemically modified bitumen and the bitumen constituting the continuous phase. In addition. when using, as the bitumen constituting the continuous phase, a bitumen which has been untreated, a secure bonding relationship between the filler and the composite can be achieved through the use of minimum quantities of the more expensive, chemically treated bitumen composition.

In accordance with the preferred concept of the invention, it has been found that the filler is preferably treated with the chemically modified bitumen by coating the filler with the chemically modified bitumen. In that way, the coating of the chemically modified bitumen, containing groups reactive with the filler, forms a chemical bond between the chemically modified bitumen and the filler itself. Then, when the coated filler is blended with a bitumen constituting a continuous phase in which the coated filler is distributed, the coating of the chemically modified asphalt serves to intertie the filler with the asphalt constituting the continuous phase.

As the chemically modified asphalt used in the practice of this invention, use can be made of a variety of materials in which a bitumen such as asphalt has been reacted with a reactive material capable of being chemically bonded to the asphalt matrix and providing a reactive site to establish a chemical bond between the chemically modified asphalt matrix and the filler with which it is combined.

Suitable chemically modified asphalts are described in a number of copending applications, including application Ser. No. 852,772, filed Nov. 18, 1977, now abandoned, Ser. No. 881,108, filed Feb. 24, 1978, now abandoned, Ser. No. 852,898, filed Nov. 18, 1977, now U.S. Pat. No. 4,166,752 Ser. No. 881,107, filed Feb. 24, 1978, now abandoned and Ser. No. 852,778, filed Nov. 18, 1977, now abandoned. In each of those cases, a bitumen, and preferably asphalt, is reacted with a linking agent capable of reaction with the asphalt and also capable of reaction with the filler with which the chemically modified asphalt is combined. Representative linking agents include organo silicon compounds, amines, as well as a number of other compounds which are described in each of the foregoing applications, the disclosures of which are incorporated herein by reference.

In treating the filler with a chemically modified asphalt is applied in an amount sufficient to constitute from 0.1 to 50% by weight or even higher based on the weight of the filler. The coating is preferably applied when the asphalt is in the form of a hot melt, although it can also be applied when the asphalt is in the form of an emulsion, the only requirement being that a secure chemical bond be established between the chemically modified asphalt and the filler with which it is combined.

In the preferred practice of this invention, the filler is glass, either in the form of glass fibers or glass flake, or both. It has been found that the use of glass flake is particularly desirable when the asphalt is employed in road paving applications. The glass flake particles are treated with the chemically modified asphalt to form a coating on the individual particles thereof, and then laid down as a wear surface in a road paving application, preferably over an asphalt underlayer. The chemically modified asphalt present as a coating on the glass flake particles thus insures compatibility between the glass flake particles and the asphalt underlayer, while the glass flake particles themselves serve to form a moisture barrier to prevent moisture seeping into the asphalt composite.

It will, of course, be understood by those skilled in the art that the asphalt underlayer can itself be reinforced, preferably with a filler in the form of aggregate and/or glass fibers, either in the form of individual fiber filaments or bundles of glass fibers which have been coated with a chemically modified asphalt composition to establish a secure bonding relationship between the reinforcement contained in the underlayer and the asphalt forming the continuous phase thereof.

Alternatively, the fillers treated in accordance with the present invention can be used as reinforcement for materials other than bitumen composites. For example, glass fibers and glass flake which have been treated with a chemically modified asphalt in accordance with the concepts of this invention can be used in the reinforcement for other materials, including rubbers, as in the manufacture of glass fiber reinforced tires and the like, and as reinforcement for plastics, as in the manufacture of glass fiber reinforced plastics. It has been found that the chemically modified asphalts employed in the practice of this invention are compatible with and establish a secure bonding relationship with any of a number of plastics such as polyolefins, polyepoxides, polyesters, polyamides and other plastics conventionally reinforced with glass, either in the form of fibers or as flake.

When use is made of glass fibers as reinforcement for bitumens or elastomeric materials or plastics, the preferred form of the glass fiber reinforcement containing a coating of the chemically modified asphalt is in the form of bundles of glass fibers which have been impregnated with the chemically modified asphalt so that the impregnant serves to fill the bundle of fibers and separate the individual fiber filaments forming the bundle each from the other. That arrangement not only serves to cushion the fibers and prevent their destruction through mutual abrasion but also to provide a liberal quantity of chemically modified asphalt to promote compatibility with the bitumen, elastomeric or plastic material constituting the continuous phase in which the glass fibers treated with the chemically modified asphalt are combined.

Having described the basic concepts of the present invention, reference is now made to the following examples, provided by way of illustration and not by way of limitation, of the practice of the present invention in the formation of composites reinforced with chemically modified bitumen compositions.

EXAMPLE 1

Using a chemically modified asphalt prepared as described in Example 1 of application Ser. No. 852,772, glass fibers are coated with an asphalt which has been chemically modified with vinyltrimethoxysilane. The glass fibers in the form of bundles are impregnated with the chemically modified asphalt so as to deposit approximately 23.4% by weight asphalt within the glass fiber bundle, based on the weight of the glass fibers. Thereafter, the bundles are blended with untreated asphalt and the resulting composite allowed to cure.

It is found that the bundles are securely integrated with the asphalt constituting the continuous phase and provide good reinforcement therefor.

EXAMPLE 2

Using a chemically modified asphalt as described in Example 1 of copending application Ser. No. 852,778, glass flake is coated with the chemically modified asphalt and then laid down as an upper wear surface in a road paving application, overlaying an untreated asphalt layer.

It is found that the glass flake is securely integrated with the untreated asphalt forming the continuous phase with which the coated glass flake particles are combined.

EXAMPLE 3

Using glass fiber bundles prepared in the manner described in Example 1, the bundles are combined with a polyester resin as reinforcement in the manufacture of polyester pipe. It is found that the chemically modified asphalt impregnated in the glass fiber bundles establishes a secure bonding relationship between the glass fiber filament and the polyester with which the bundles are combined.

It will be understood that various changes and modifications can be made in the details of procedure, formulation and use, without departing from the spirit of the invention, especially as defined in the following claims.

We claim:

1. A bituminous composite comprising (1) a bitumen as a continuous phase and (2) a siliceous filler component comprising (a) glass fibers and (b) a coating on the glass fibers, said coating comprising a chemically modified bitumen capable of reaction with the glass fibers to chemically bond the chemically modified bitumen to the glass fibers.

2. A composite as defined in claim 1 wherein the bitumen is an asphalt.

3. A composite as defined in claim 1 wherein the coating is in the form of a thin coating on the individual glass filaments.

* * * * *